(12) United States Patent
Barton et al.

(10) Patent No.: US 11,616,727 B2
(45) Date of Patent: Mar. 28, 2023

(54) DATA PIPELINE CONFIGURATION USING NETWORK SENSORS

(71) Applicant: Cisco Technology, Inc., San Jose, CA (US)

(72) Inventors: Robert E. Barton, Richmond (CA); Jerome Henry, Pittsboro, NC (US); Thomas Szigeti, Vancouver (CA); Daniel Eckstein, Bonn (DE)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 17/223,396

(22) Filed: Apr. 6, 2021

(65) Prior Publication Data
US 2022/0321484 A1 Oct. 6, 2022

(51) Int. Cl.
*H04L 47/2416* (2022.01)
*H04L 41/08* (2022.01)
*H04L 41/0816* (2022.01)
*H04L 47/193* (2022.01)

(52) U.S. Cl.
CPC ...... *H04L 47/2416* (2013.01); *H04L 41/0816* (2013.01); *H04L 41/0886* (2013.01); *H04L 47/193* (2013.01)

(58) Field of Classification Search
CPC ............. H04L 47/2416; H04L 41/0816; H04L 41/0886; H04L 47/193
See application file for complete search history.

(56) References Cited

U.S. PATENT DOCUMENTS

| | | | |
|---|---|---|---|
| 8,228,954 B2 | 7/2012 | Thubert et al. | |
| 9,929,913 B2 | 3/2018 | Dawson et al. | |
| 10,530,665 B2 | 1/2020 | Thubert et al. | |
| 10,833,888 B2 | 11/2020 | Kim et al. | |
| 2012/0281540 A1* | 11/2012 | Khan | H04L 61/5007 370/328 |
| 2015/0296043 A1 | 10/2015 | Kim et al. | |

(Continued)

FOREIGN PATENT DOCUMENTS

WO 2017216811 12/2017

OTHER PUBLICATIONS

SD-Access Segmentation Design Guide, May 2018, Cisco Validated Design (Year: 2018).*

(Continued)

*Primary Examiner* — Tejis Daya
(74) *Attorney, Agent, or Firm* — Behmke Innovation Group LLC; Kenneth J. Heywood; Jonathon P. Western

(57) ABSTRACT

In one embodiment, a service associates a plurality of descriptive tags with a node in a network, based on an inspection of packets sent by the node that is performed by one or more sensors deployed to the network. The service identifies, based on the plurality of descriptive tags, data to be extracted from traffic of the node by an edge device located at an edge of the network. The service determines, based on the plurality of descriptive tags, an external destination to which the data should be sent by the edge device after extraction. The service sends a data pipeline configuration to the edge device, wherein the data pipeline configuration causes the edge device to extract the data from the traffic sent by the node and to send the data to the external destination.

20 Claims, 13 Drawing Sheets

(56) References Cited

U.S. PATENT DOCUMENTS

| | | | |
|---|---|---|---|
| 2016/0150459 A1* | 5/2016 | Patil | H04W 40/28 370/328 |
| 2016/0359658 A1* | 12/2016 | Yadav | H04L 63/1433 |
| 2020/0119939 A9 | 4/2020 | Guedalia et al. | |

OTHER PUBLICATIONS

Shahid, et al., "IoT Devices Recognition Through Network Traffic Analysis", 2018 IEEE International Conference on Big Data (Big Data), Seattle, WA, USA, 2018, pp. 5187-5192.

"Network Performance Monitor", online: https://www.solarwinds.com/network-performance-monitor/use-cases/network-device-scanner, accessed Mar. 24, 2021, 4 pages, SolarWinds Worldwide, LLC.

Miettinen, et al., "IoT Sentinel: Automated Device-Type Identification for Security Enforcement in IoT", online: https://arxiv.org/pdf/1611.04880.pdf, Dec. 2016, 11 pages, arxiv.org.

"Cisco Edge Intelligence", Doc. No. C45-743263-01, Nov. 2020, 2 pages, Cisco.

Maisl, Fabien, "Cisco Cyber Vision: Under the Hood", online: https://blogs.cisco.com/internet-of-things/cisco-cyber-vision-under-the-hood, Feb. 2020, 5 pages, Cisco.com.

* cited by examiner

COMPONENT TAGS

- ☐ Components without tags
- ☐ ▼ Device - Level 0-1
  - ☐ IO Module (3)
  - ☐ Wireless IO Module (2)
- ☐ ▼ Device - Level 2
  - ☐ Citect Alarm Server
  - ☐ Citect IO Server
  - ☐ Citect Report Server
  - ☐ Citect Trend Server
  - ☐ Engineering Station (3)
  - ☐ Master
  - ☐ PLC (9)
  - ☐ SCADA Station (3)
  - ☐ Slave
  - ☐ Train
- ☐ ▼ Device - Level 3-4
  - ☐ Admin Server (1)
  - ☐ DNS Server (2)
  - ☐ Database Server
  - ☐ Email Server
  - ☐ File Transfer Server
  - ☐ HTTP Client
  - ☐ Historian
  - ☐ Host Config Server (3)
  - ☐ Key Management Server
  - ☐ License Management Server
  - ☐ Log Server
- ☐ ▼ Network analysis
  - ☐ Port Scan
  - ☐ Port Scan Target
  - ☐ Public IP (19)
- ☐ ▼ Software
  - ☐ Active Directory
  - ☐ CodeSys
  - ☐ DFS
  - ☐ Lotus notes
  - ☐ Microsoft Exchange
  - ☐ NSIS
  - ☐ NetLogon
  - ☐ PI Osisoft
  - ☐ WINS
  - ☐ WMI
  - ☐ WinRM
  - ☐ Windows (10)
  - ☐ Windows Audio
  - ☐ Windows CSP
  - ☐ Windows Connection Manager
  - ☐ Windows DTCPing
  - ☐ Windows File Protection
  - ☐ Windows Messenger Service
  - ☐ Windows Network DDE
  - ☐ Windows Plug and Play
  - ☐ Windows SCM
  - ☐ Windows SecondaryLogon
  - ☐ Windows Task Scheduler
  - ☐ Windows WebClient

ACTIVITY TAGS
- ☐ Activities without tags
- ☐ ▼ Control system behavior
  - ☐ Block Download
  - ☐ Control action (1)
  - ☐ Controller Info
  - ☐ Controller Name
  - ☐ Data Push
  - ☐ Device Init (1)
  - ☐ Diagnostics
  - ☐ Emergency Brake
  - ☐ Firmware Download
  - ☐ Firmware Update
  - ☐ Force Variable
  - ☐ Heartbeat
  - ☐ Hot Reboot
  - ☐ Insert Program
  - ☐ Installed Modules
  - ☐ Memory Formatting
  - ☐ Network Configuration
  - ☐ Operational Change
  - ☐ PLC Clock
  - ☐ PLC Reservation
  - ☐ Password Change
  - ☐ Program Download (4)
  - ☐ Program Upload (2)
  - ☐ Programming CPU

- ☐ ▼ IT behavior
  - ☐ Active Directory Replication
  - ☐ Admin (1)
  - ☐ Antivirus
  - ☐ Authentication (1)
  - ☐ Database
  - ☐ Email
  - ☐ Host Config (11)
  - ☐ IT File Sync
  - ☐ IT File Transfer
  - ☐ Key management
  - ☐ License Management
  - ☐ Log
  - ☐ Net Management (3)
  - ☐ Net Routing
  - ☐ Ping (10)
  - ☐ Power Management
  - ☐ Printer Management
  - ☐ Procedure Call
  - ☐ Proxy
  - ☐ Remote access (1)
  - ☐ Streaming
  - ☐ Time Management (9)
  - ☐ VPN
  - ☐ Web (3)
  - ☐ Windows DFS Replication
  - ☐ Windows Discovery
- ☐ ▼ Network analysis
  - ☐ Authentication Error
  - ☐ Broadcast (81)

FIG. 6B

DATA PIPELINE CONFIGURATION USING NETWORK SENSORS

TECHNICAL FIELD

The present disclosure relates generally to computer networks, and, more particularly, to data pipeline configuration using network sensors.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

As the IoT evolves, the variety of IoT devices will continue to grow, as well as the number of applications associated with the IoT devices. For instance, multiple cloud-based, business intelligence (BI) applications may take as input measurements captured by a particular IoT sensor. To this end, data pipelines are often constructed from the edge device(s) of the IoT network to the destination cloud provider.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate examples of descriptive tags for network nodes; and

DESCRIPTION OF EXAMPLE EMBODIMENTS

Overview

Figure 1:
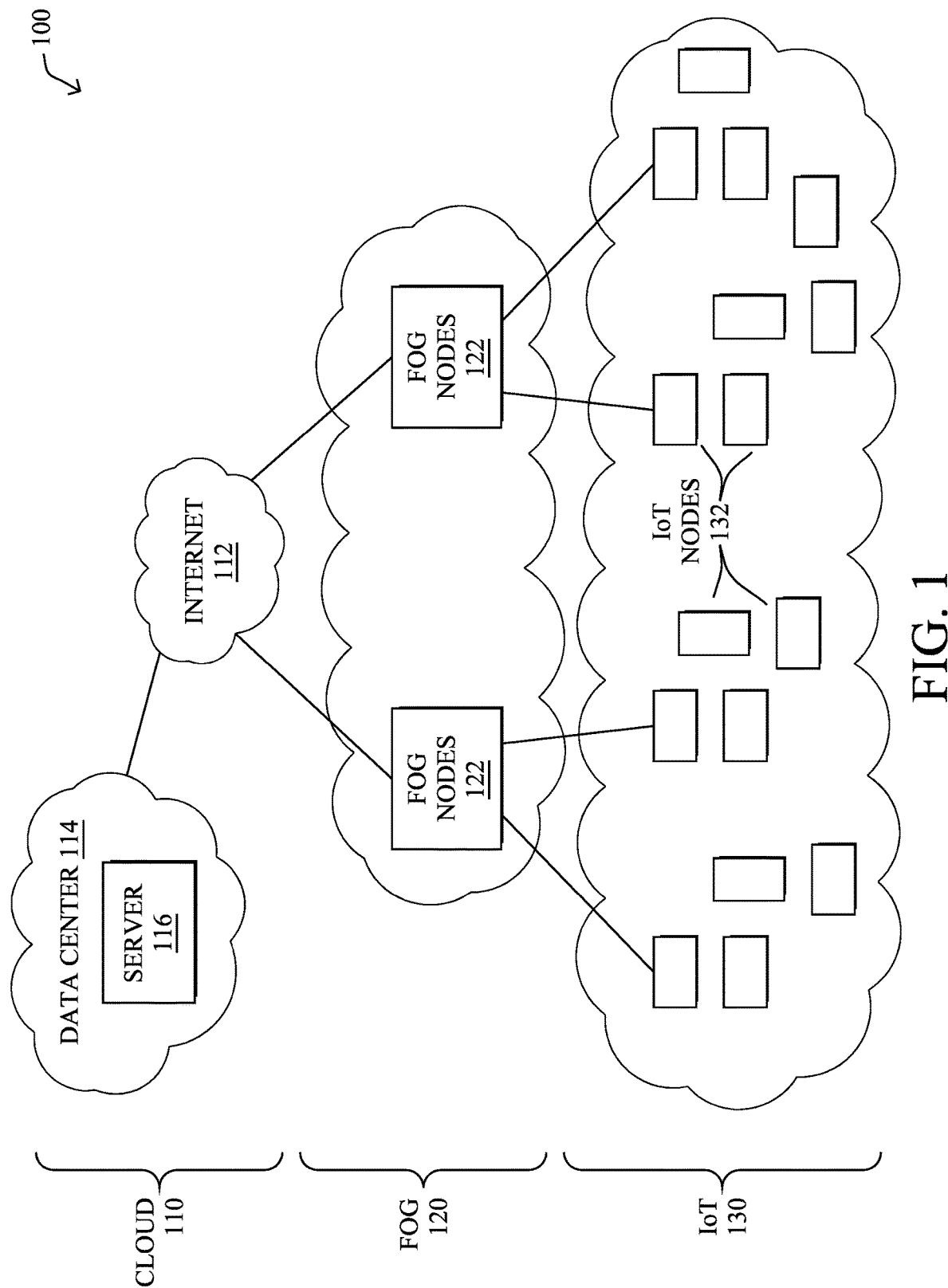
FIG. 1 illustrate an example network.

According to one or more embodiments of the disclosure, a service associates a plurality of descriptive tags with a node in a network, based on an inspection of packets sent by the node that is performed by one or more sensors deployed to the network. The service identifies, based on the plurality of descriptive tags, data to be extracted from traffic of the node by an edge device located at an edge of the network. The service determines, based on the plurality of descriptive tags, an external destination to which the data should be sent by the edge device after extraction. The service sends a data pipeline configuration to the edge device, wherein the data pipeline configuration causes the edge device to extract the data from the traffic sent by the node and to send the data to the external destination.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
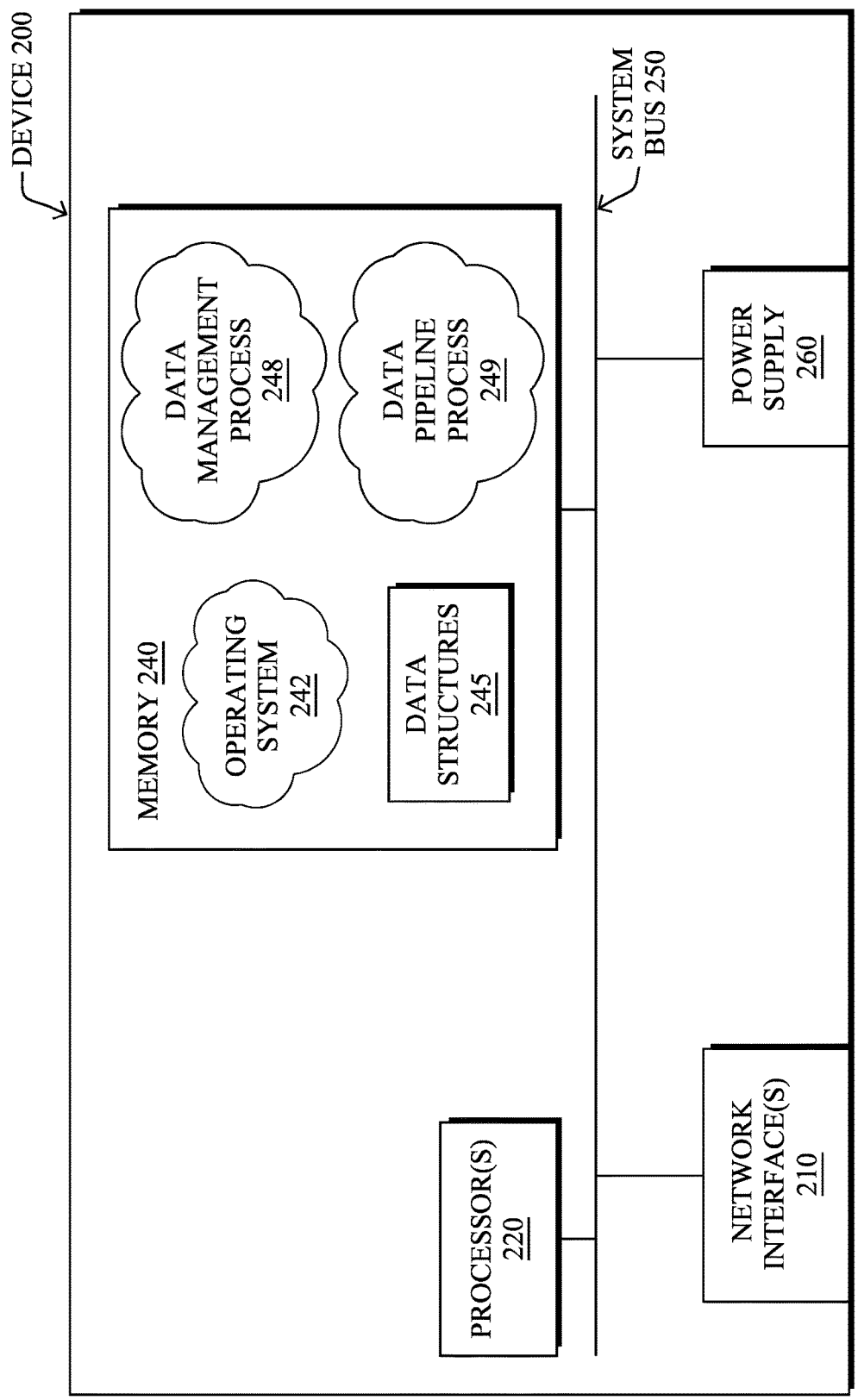
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data management process 248 and/or a data pipeline configuration process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
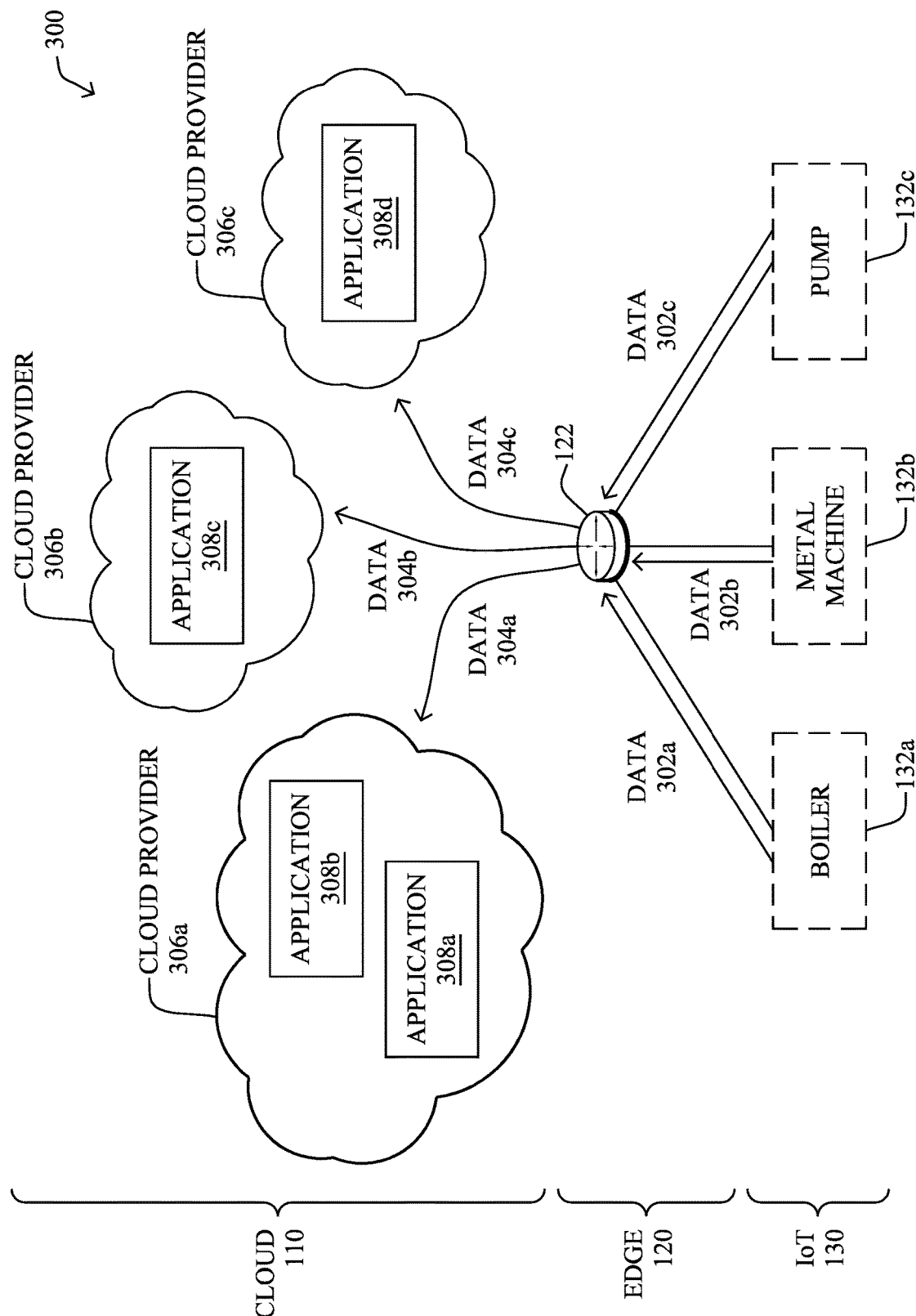
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As noted above, as the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications 308 hosted by different cloud providers 306, such as Microsoft Azure, Software AG, Quantela, MQTT/DC, or the like.

To complicate the collection and distribution of data 302a-302c, the different applications 308 may also require different sets of data 304a-304c from data 302a-302c. For instance, assume that cloud provider 306a hosts application 308a, which is a monitoring application used by the operator of the IoT network. In addition, cloud provider 306a may also host application 308b, which is a developer application that allows the operator of the IoT network to develop and deploy utilities and configurations for the IoT network. Another application, application 308c, may be hosted by an entirely different cloud provider 306b and be used by the vendor or manufacturer of a particular IoT node 132 for purposes. Finally, a further application, application 308d, may be hosted by a third cloud provider 306c, which is used by technicians for purposes of diagnostics and the like.

From the standpoint of the edge device 122, such as a gateway, router, switch, access point, or other device located at the edge of the IoT network, the lack of harmonization between data consumers can lead to overly complicated data access policies, virtual models of IoT nodes 132 (e.g., 'device twins' or 'device shadows') that are often not portable across cloud providers 306, and increased resource consumption. In addition, different IoT nodes may communicate using different protocols within the IoT network. For instance, IoT nodes 132a-132c may communicate using MQTT, Modbus, OPC Unified Architecture (OPC UA), combinations thereof, or other existing communication protocols that are typically used in IoT networks. As a result, the various data pipelines must be configured on an individual basis at edge device 122 and for each of the different combinations of protocols and destination cloud providers 306.

Figure 4A:
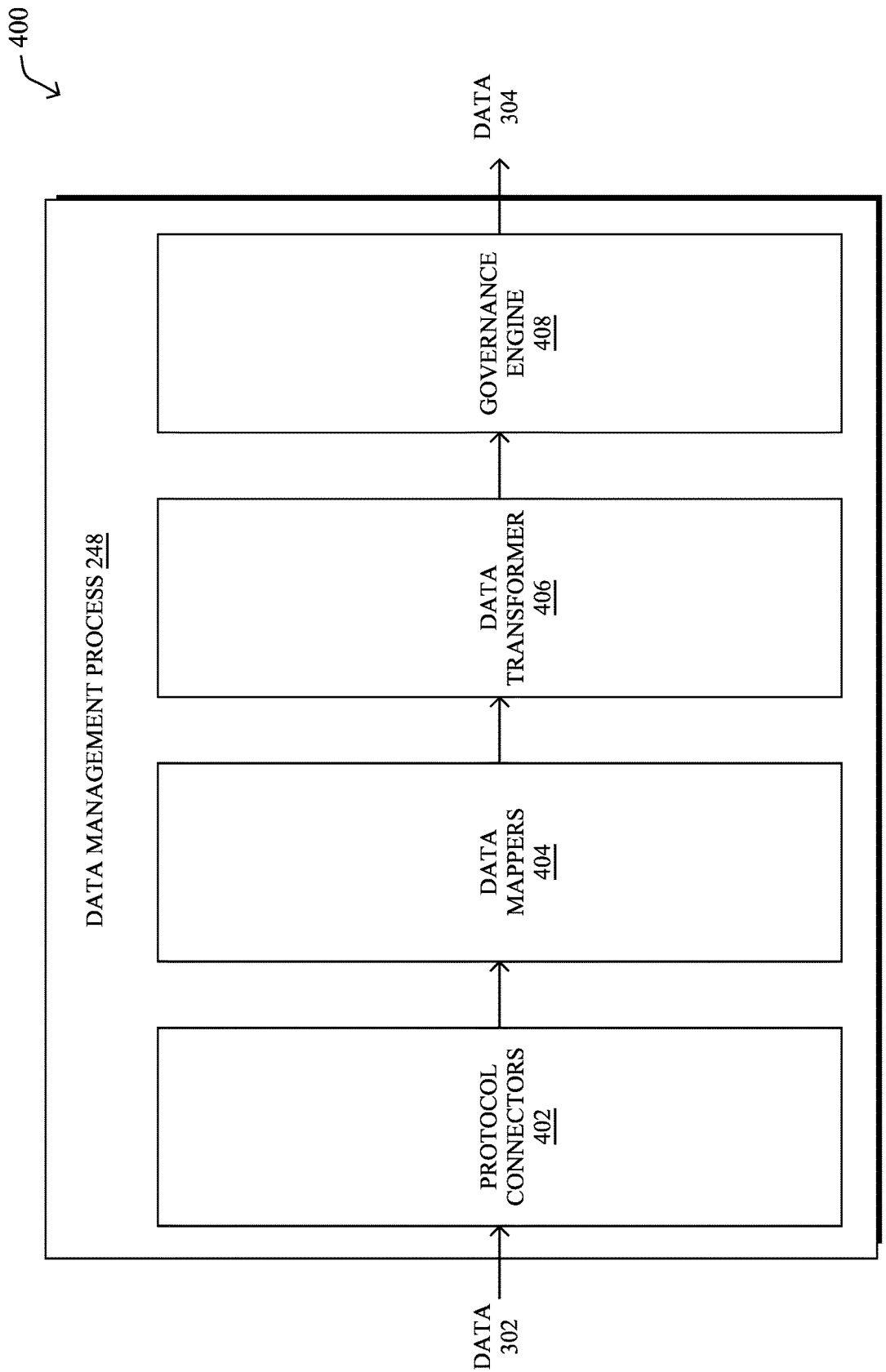
FIGS. 4A-4B illustrate examples of data processing by an edge device in a network.

FIG. 4A illustrates an example architecture 400 for data management process 248, according to various embodiments. As shown, data management process 248 may comprise any or all of the following components: a plurality of protocol connectors 402, data mappers 404, a data transformer 406, and/or a governance engine 408. Typically, these components are executed on a single device located at the edge of the IoT network. However, further embodiments provide for these components to be executed in a distributed manner across multiple devices, in which case the combination of devices can be viewed as a singular device for purposes of the teachings herein. Further, functionalities of the components of architecture 400 may also be combined, omitted, or implemented as part of other processes, as desired.

During execution, protocol connectors 402 may comprise a plurality of southbound connectors that are able to extract data 302 from traffic in the IoT network sent via any number of different protocols. For instance, protocol connectors 402 may include connectors for OPC UA, Modbus, Ethernet/IP, MQTT, and the like. Accordingly, when the device executing data management process 248 (e.g., device 200) receives a message from the IoT network, such as a packet, frame, collection thereof, or the like, protocol connectors 402 may process the message using its corresponding connector to extract the corresponding data 302 from the message.

Once data management process 248 has extracted data 302 from a given message using the appropriate connector in protocol connectors 402, data mappers 404 may process the extracted data 302. More specifically, in various embodiments, data mappers 404 may normalize the extracted data 302. Typically, this may entail identifying the data extracted from the traffic in the network as being of a particular data type and grouping the data extracted from the traffic in the network with other data of the particular data type. In some instances, this may also entail associating a unit of measure with the extracted data 302 and/or converting a data value in one unit of measure to that of another.

In various embodiments, once data 302 has been extracted and normalized, data transformer 406 may apply any number of data transformation to the data. In some embodiments, data transformer 406 may transform data 302 by applying any number of mathematical and/or symbolic operations to it. For instance, data transformer 406 may apply a data compression or data reduction to the extracted and normalized data 302, so as to summarize or reduce the volume of data transmitted to the cloud. To do so, data transformer 406 may sample data 302 over time, compute statistics regarding data 302 (e.g., its mean, median, moving average, etc.), apply a compression algorithm to data 302, combinations thereof, or the like.

In further embodiments, data transformer 406 may apply analytics to the extracted and normalized data 302, so as to transform the data into a different representation, such as an alert or other indication. For instance, data transformer 406 may apply simple heuristics and/or thresholds to data 302, to transform data 302 into an alert. In another embodiment, data transformer 406 may apply machine learning to data 302, to transform the data.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Data transformer 406 may employ one or more supervised, unsupervised, or semi-supervised machine learning models. Generally, supervised learning entails the use of a training set of data that is used to train the model to apply labels to the input data. For example, the training data may include samples of 'good' readings or operations and 'bad' readings or operations that are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, an unsupervised model may Semi-supervised learning models take a middle ground approach that uses a greatly reduced set of labeled training data.

Example machine learning techniques that data transformer 406 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

In further embodiments, data transformer 406 may comprise a scripting engine that allows developers to deploy any number of scripts to be applied to data 302 for purposes of the functionalities described above. For instance, an application developer may interface with application 308b shown previously in FIG. 3, to develop and push various scripts for execution by data transformer 406, if allowed to do so by policy. In other cases, previously developed scripts may also be pre-loaded into data transformer 406 and/or made available by the vendor or manufacturer of the device executing data management process 248 for deployment to data transformer 406.

According to various embodiments, another potential component of data management process 248 is governance engine 408 that is responsible for sending the data 302 transformed by data transformer 406 to any number of cloud providers as data 304. In general, governance engine 408 may control the sending of data 304 according to a policy. For instance, governance engine 408 may apply a policy that specifies that data 304 may be sent to a particular cloud provider and/or cloud-based application, but should not be sent to others. In some embodiments, the policy enforced by governance engine 408 may control the sending of data 304 on a per-value or per-data type basis. For instance, consider the case of an IoT node reporting a temperature reading and pressure reading. In such a case, governance engine 408 may send the temperature reading to a particular cloud provider as data 304 while restricting the sending of the pressure reading, according to policy.

As would be appreciated, by unifying the policy enforcement via governance engine 408, the various stakeholders in the data pipelines are able to participate in the creation and maintenance of the enforced policies. Today, the various data pipelines built to support the different network protocols and cloud vendors results in a disparate patchwork of policies that require a level of expertise that not every participant may possess. In contrast, by unifying the policy enforcement via governance engine 408, personnel such as security experts, data compliance representatives, technicians, developers, and the like can participate in the administration of the policies enforced by governance engine 408.

Figure 4B:
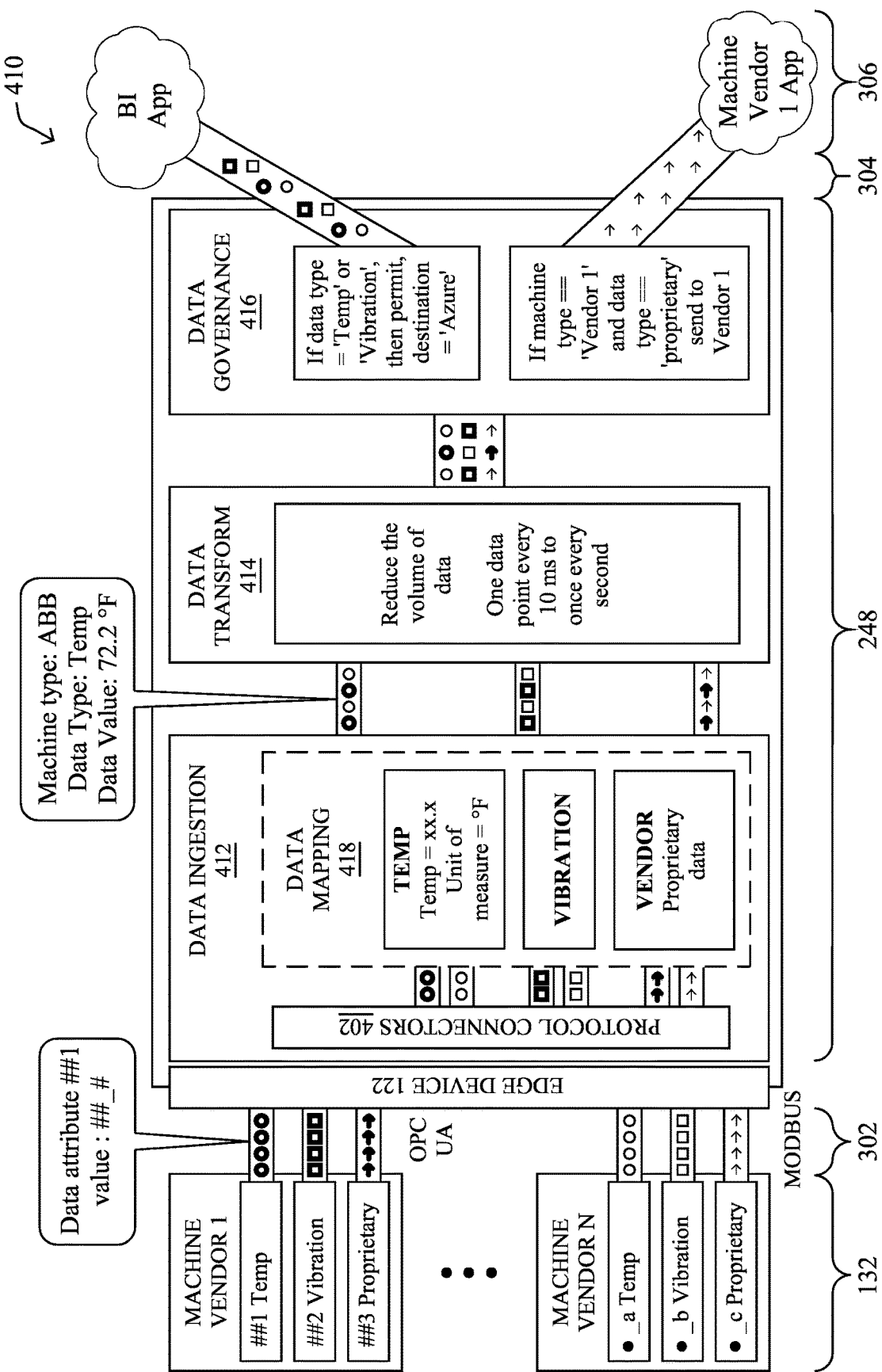

FIG. 4B illustrates an example 410 of the operation of data management process 248 during execution, according to various embodiments. As shown, assume that edge device 122 described previously (e.g., a device 200) executes data management process 248 at the edge of an IoT network that comprises IoT nodes 132. During operation, edge device 122 may communicate with IoT nodes 132 in the network that comprise devices from n-number of different vendors.

Each set of vendor devices in IoT nodes 132 may generate different sets of data, such as sensor readings, computations, or the like. For instance, the devices from a first machine vendor may generate data such as a proprietary data value, a temperature reading, and a vibration reading. Similarly, the devices from another machine vendor may generate data such as a temperature reading, a vibration reading, and another data value that is proprietary to that vendor.

As would be appreciated, the data 302 generated from each group of IoT nodes 132 may use different formats that are set by the device vendors or manufacturers. For instance, two machines from different vendors may both report temperature readings, but using different data attribute labels (e.g., "temp=," "temperature=," "##1," "*_a," etc.). In addition, the actual data values may differ by vendor, as well. For instance, the different temperature readings may report different levels of precision/number of decimals, use different units of measure (e.g., Celsius, Fahrenheit, Kelvin, etc.), etc.

Another way in which data 302 generated by IoT nodes 132 may differ is the network protocol used to convey data 302 in the network. For instance, the devices from one machine vendor may communicate using the OPC UA protocol, while the devices from another machine vendor may communicate using the Modbus protocol.

In response to receiving data 302 from IoT nodes 132, data management process 248 of edge device 122 may process data 302 in three stages: a data ingestion phase 412, a data transformation phase 414, and a data governance phase 416. These three processing phases operate in conjunction with one another to allow edge device 122 to provide data 304 to the various cloud providers 306 for consumption by their respective cloud-hosted applications.

During the data ingestion phase 412, protocol connectors 402 may receive messages sent by IoT nodes 132 in their respective protocols, parse the messages, and extract the relevant data 302 from the messages. For instance, one protocol connector may process OPC UA messages sent by one set of IoT nodes 132, while another protocol connector may process Modbus messages sent by another set of IoT nodes 132. Once protocol connectors 402 have extracted the relevant data 302 from the messages, data management process 248 may apply a data mapping 418 to the extracted data, to normalize the data 302. For instance, data management process 248 may identify the various types of reported data 302 and group them by type, such as temperature measurements, vibration measurements, and vendor proprietary data. In addition, the data mapping 418 may also entail standardizing the data on a particular format (e.g., a particular number of digits, unit of measure, etc.). The data mapping 418 may also entail associating metadata with the extracted data 302, such as the source device type, its vendor, etc.

During its data transformation phase 414, data management process 248 may apply various transformations to the results of the data ingestion phase 412. For instance, assume that one IoT node 132 reports its temperature reading every 10 milliseconds (ms). While this may be acceptable in the IoT network, and even required in some cases, reporting the temperature readings at this frequency to the cloud-providers may represent an unnecessary load on the WAN connection between edge device 122 and the cloud provider(s) 306 to which the measurements are to be reported. Indeed, a monitoring application in the cloud may only need the temperature readings at a frequency of once every second, meaning that the traffic overhead to the cloud provider(s) 306 can be reduced by a factor of one hundred by simply reporting the measurements at one second intervals. Accordingly, data transformation phase 414 may reduce the volume of data 304 sent to cloud provider(s) 306 by sending only a sampling of the temperature readings (e.g., every hundred), an average or other statistic(s) of the temperature readings in a given time frame, or the like.

During its data governance phase 416, data management process 248 may apply any number of different policies to the transformed data, to control how the resulting data 304 is sent to cloud provider(s) 306. For instance, one policy enforced during data governance phase 416 may specify that if the data type='Temp' or 'Vibration,' then that data is permitted to be sent to destination='Azure,' for consumption by a BI application hosted by Microsoft Azure. Similarly, another policy may specify that if the machine type='Vendor 1' and the data type='proprietary,' then the corresponding data can be sent to a cloud provider associated with the vendor.

In some embodiments, the policy enforced during data governance phase 416 may further specify how data 304 is sent to cloud providers 306. For instance, the policy may specify that edge device 122 should send data 304 to a particular cloud provider 306 via an encrypted tunnel, using a particular set of one or more protocols (e.g., MQTT), how the connection should be monitored and reported, combinations thereof, and the like.

As noted above, edge devices are increasingly sending data from IoT endpoints to multiple cloud providers for consumption by various applications. Indeed, both the manufacturers of many IoT nodes and the operators of those nodes may need access to the data being generated by the IoT nodes. For instance, the manufacturer of an IoT node may monitor its nodes to gain performance insights and perform preventative maintenance. Conversely, the operator of the IoT node, such as the owner of a factory, may collect real-time telemetry data from the device to ensure that their business is running, optimally.

However, there are almost limitless types of IoT nodes, each node supporting different data models that define how the data is processed at the edge (e.g., ingested, transformed, etc.). Additionally, there is a plethora of different cloud analytics services to which the data may need to be sent. Further, the various IoT nodes may generate data differently, meaning that a new data model and data pipeline may need to be defined, potentially on a per-node basis, creating a great amount of overhead on the operator and solutions integrator.

Data Pipeline Configuration Using Network Sensors

The techniques introduced herein allow for the automatic configuration of data models and data management pipelines at the edge of a network, when a new endpoint node joins the network. In some aspects, information garnered by one or more network sensors that inspect packets sent by the node may be used to drive the pipeline configuration for the edge device. Such a configuration may configure the edge device to extract, map, transform, and/or send data generated by the endpoint node for consumption by any number of applications or other destinations hosted across various cloud providers.

Illustratively, the techniques described herein may be performed by hardware, software, and/or firmware, such as in accordance with data management process 248 and/or data pipeline configuration process 249, which may include computer executable instructions executed by the processor 220 (or independent processor of interfaces 210) to perform functions relating to the techniques described herein.

Specifically, in various embodiments, a service associates a plurality of descriptive tags with a node in a network, based on an inspection of packets sent by the node that is performed by one or more sensors deployed to the network. The service identifies, based on the plurality of descriptive tags, data to be extracted from traffic of the node by an edge device located at an edge of the network. The service determines, based on the plurality of descriptive tags, an external destination to which the data should be sent by the edge device after extraction. The service sends a data pipeline configuration to the edge device, wherein the data pipeline configuration causes the edge device to extract the data from the traffic sent by the node and to send the data to the external destination.

Operationally, FIGS. 5A-5E illustrates an example of the configuration of a data pipeline at an edge of a network, according to various embodiments. Continuing the previous examples, assume that there is an edge device 122 located at the edge of a network to which a new IoT node 132d joins (e.g., a new sensor, actuator, etc.). Further, assume that there is a supervisory service 508 that is part of a configuration and control plane and provides supervisory control over edge device 122, once edge device 122 is enrolled with supervisory service 508. For instance, supervisory service 508 may take the form of a server that serves Edge Intelligence Control Service by Cisco Systems, Inc., or another device that provides a supervisory service to edge device 122. Note that while supervisory service 508 is typically located externally to the network in which IoT node 132*d* is located, further embodiments provide for supervisory service 508 to be located within that network, as well.

In the cloud, assume that there is an application 308*e* hosted by cloud provider 306*d* that is to consume data generated by IoT node 132*d*. For instance, application 308*e* may be a monitoring application used by the operator of the network to which IoT node 132*d* was added to monitor an industrial process, the manufacturer of IoT node 132*d* for purposes of performing diagnostics or updates, etc. In further instances, application 308*e* may take the form of a message broker, such as an MQTT message broker to which messages may be published by edge device 122.

According to various embodiments, one or more sensor(s) 504 may be deployed to the networking equipment 502 (e.g., switches, routers, etc.) located within the network of IoT node 132*d*. Preferably, sensor(s) 504 are software-based modules executed directly by networking equipment 502. However, further embodiments provide for sensor(s) 504 to be hardware-based modules communicatively coupled to networking equipment 502, or a combination of hardware-based and software-based modules deployed to the network.

For instance, assume that IoT node 132*d* begins sending packets 506 to other nodes, such as any of IoT nodes 132*a*-132*c*. In such a case, sensor(s) 504 may inspect packets 506, to garner information about IoT node 132*d*, not only about the identity of IoT node 132*d*, but also regarding its actions that it performs on the network. Such information may include, but not limited to, any or all of the following:

The device type of the node;
The manufacturer of the node;
The model of the node;
The software and/or hardware versions of the node;
The address information (e.g., MAC, IP, etc.) of all nodes with which the node is communicating;
The address information of the node;
The activity profile of the node (e.g., how is it trying to communicate), such as the protocol(s) that it uses to communicate;
The commands that are being passed (e.g., SCADA commands, etc.), down to the specific control parameter values;
Etc.

The sensor modules of networking equipment 502 then organize the collected information into meaningful, descriptive tags. In general, these descriptive tags are simply a way to categorize nodes and their behaviors, similar to the same way a human may look at a pen or a pencil and categorize them as writing instruments. Each node can also have multiple descriptive tags associated with it, such as the following:

Component Tags—these tags identify device specific details (e.g., Device ID. SCADA station. PLC. Windows device, etc.).
Activity Tags—these tags identify what the device is doing at the protocol level (e.g., Programming CPU, Heartbeat. Emergency Break. Data Push, etc.).
User-Defined Tags—these could be custom tags to supply additional context (e.g. a "Cell 1 Tag").
Dynamically Generated Tags—these could be added dynamically (e.g., using machine learning) to signify whether the behavior of the device is normal or anomalous, or for other dynamic conditions.
Scalable Group Tags—These tags are applied to specific packet flows between a defined group of devices/services in the network. For example, in the case shown, IoT node 132*d* and IoT nodes 132*a*-132*c* may be tagged as belonging to a particular group.

The sensor(s) 504 embedded in networking equipment 502 may also collect metadata about the communicating nodes/endpoints, including their network identifiers (e.g., IP and MAC addresses), vendor, device-type, firmware version, the switch ID and port where the device is connected, etc. As sensor(s) learns details of a new node in the network, such as IoT node 132*d*, sensors) 504 may send its collected metadata about that node, along with its tags, to supervisory service 508 via reporting message 510. In other words, sensor(s) 504 may function as an extension of supervisory service 508 to acquire information about IoT node 132*d* through analysis of its traffic.

In this manner, supervisory service 508 may maintain an inventory of each of the nodes in the network, their associated tags, and/or their metadata. Thus, as new nodes are discovered in the network by sensor(s) 504, supervisory service 508 may add their profile information to a live inventory of nodes/devices in the network. As noted above, the various tags applied by sensor(s) 504 used by supervisory service 508 may be predefined or may be user-defined.

FIGS. 6A-6B illustrate example listings 600, 610, respectively, showing exemplary component and activity tags that may be associated with a network node, in some embodiments. As shown, the various component tags in listing 600 can be used to identify a particular endpoint or other node in the network by its type (e.g., PLC, SCADA station, etc.), its software (e.g., CodeSys, Windows, etc.), or the like. In addition, analysis of the traffic of the device can also lead to various activity tags in listing 610 being applied to that node, as well. For example, such activity tags may distinguish between control system behaviors (e.g., insert program, device init., etc.) and IT behaviors (e.g., host config., ping, etc.).

Referring again to FIGS. 5A-5E, supervisory service 508 may, based on the tag profile of IoT node 132*d*, identify the data to be extracted from the traffic of IoT node 132*d*, as shown in FIG. 5B, in various embodiments. For instance, if the profile of IoT node 132*d* includes tags indicating that IoT node 132*d* generates certain types of sensor measurements (e.g., temperature, vibration, etc.), supervisory service 508 may determine that this information should be extracted/ingested by edge device 122 through the use of the techniques described previously with respect to FIGS. 4A-4B.

Figure 5A:
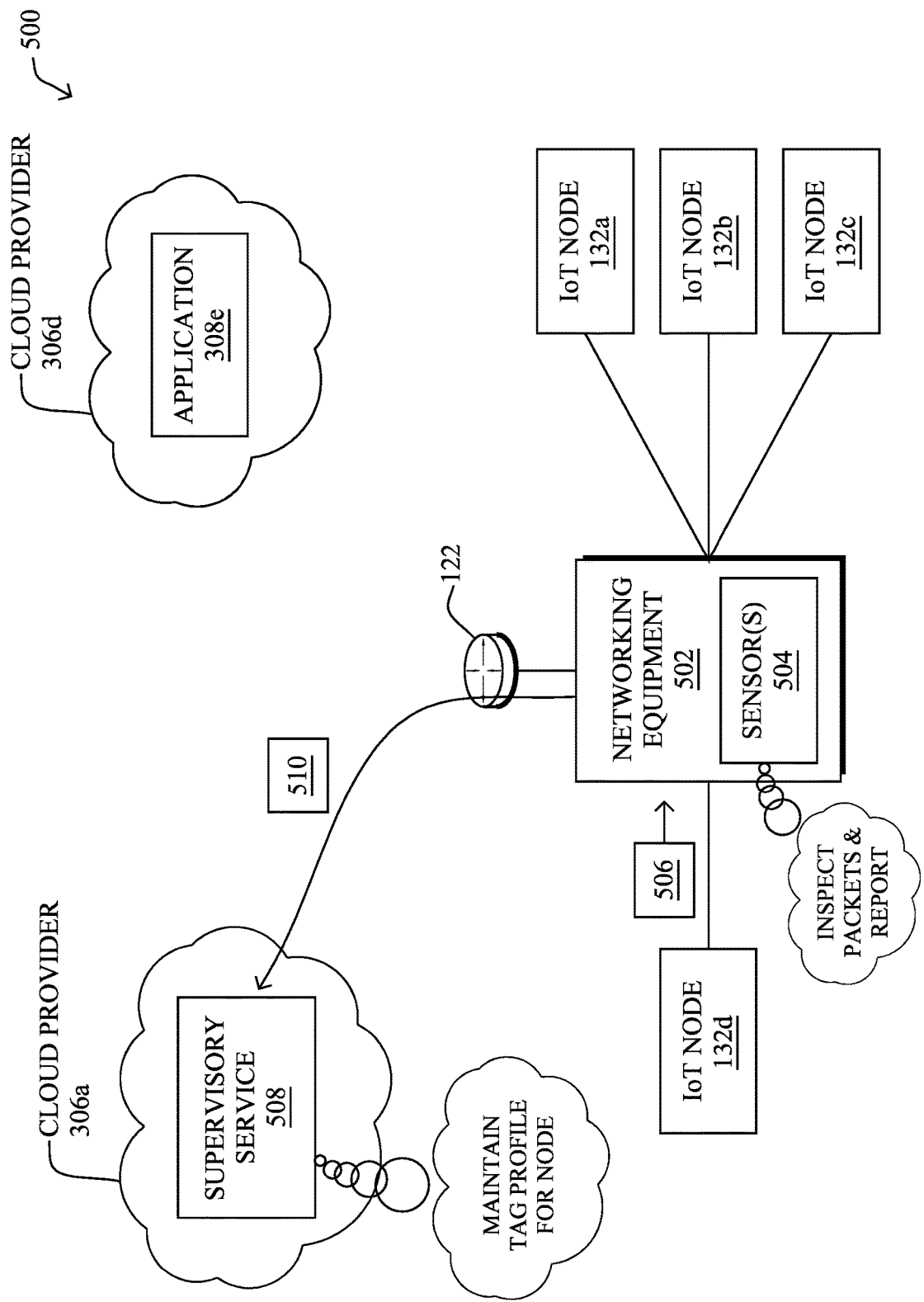
FIGS. 5A-5E illustrates an example of the configuration of a data pipeline at an edge of a network.
Figure 5B:
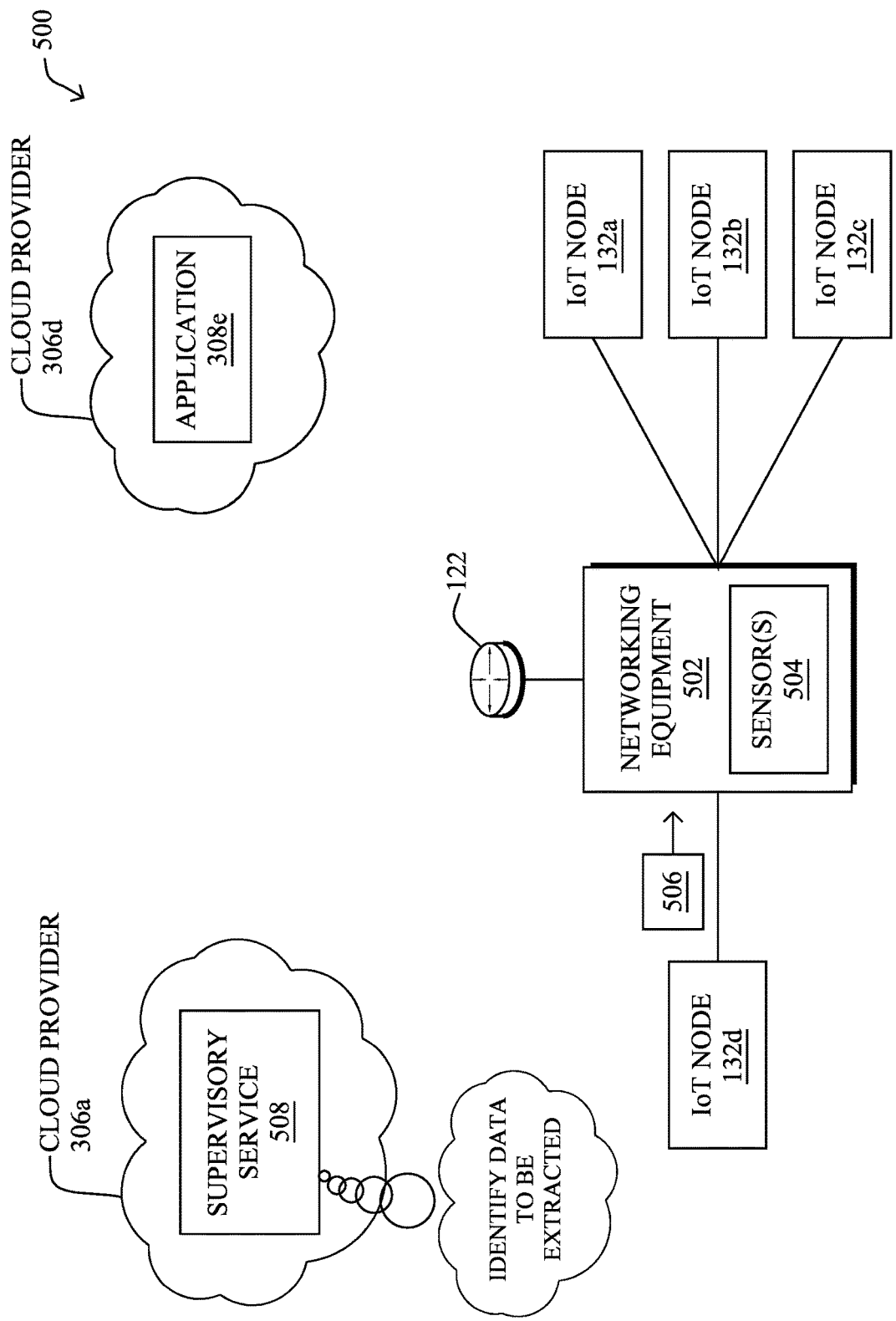
Figure 5C:
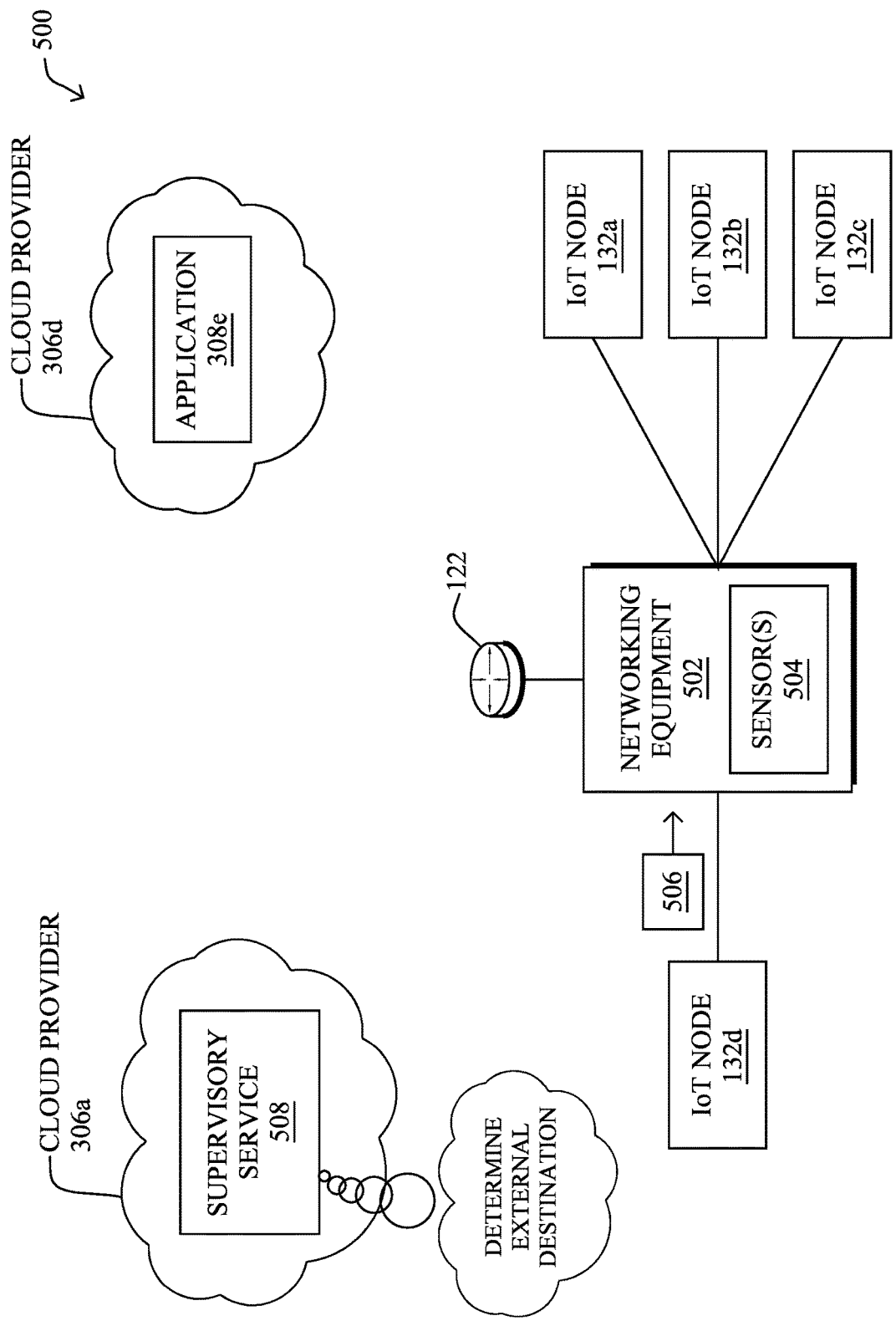

As shown in FIG. 5C, another parameter that supervisory service 508 may determine, based on the profile and tags associated with IoT node 132*d* is the external destination(s) to which edge device 122 should send the data extracted from the traffic of IoT node 132*d*. For instance, assume that there is an external application 308*e* hosted by a cloud provider 306*d* that is external to the network of IoT node 132*d*. For instance, application 308*e* may take the form of an MQTT message broker, application associated with the operator of the network in which IoT node 132*d* is located, the manufacturer of IoT node 132*d*, etc. Supervisory service 508 may do so, for instance, based on the identity or location of IoT node 132*d*, supervisory service 508 may determine that the data from IoT node 132*d* should be exported externally to application 308*e*.

Figure 5D:
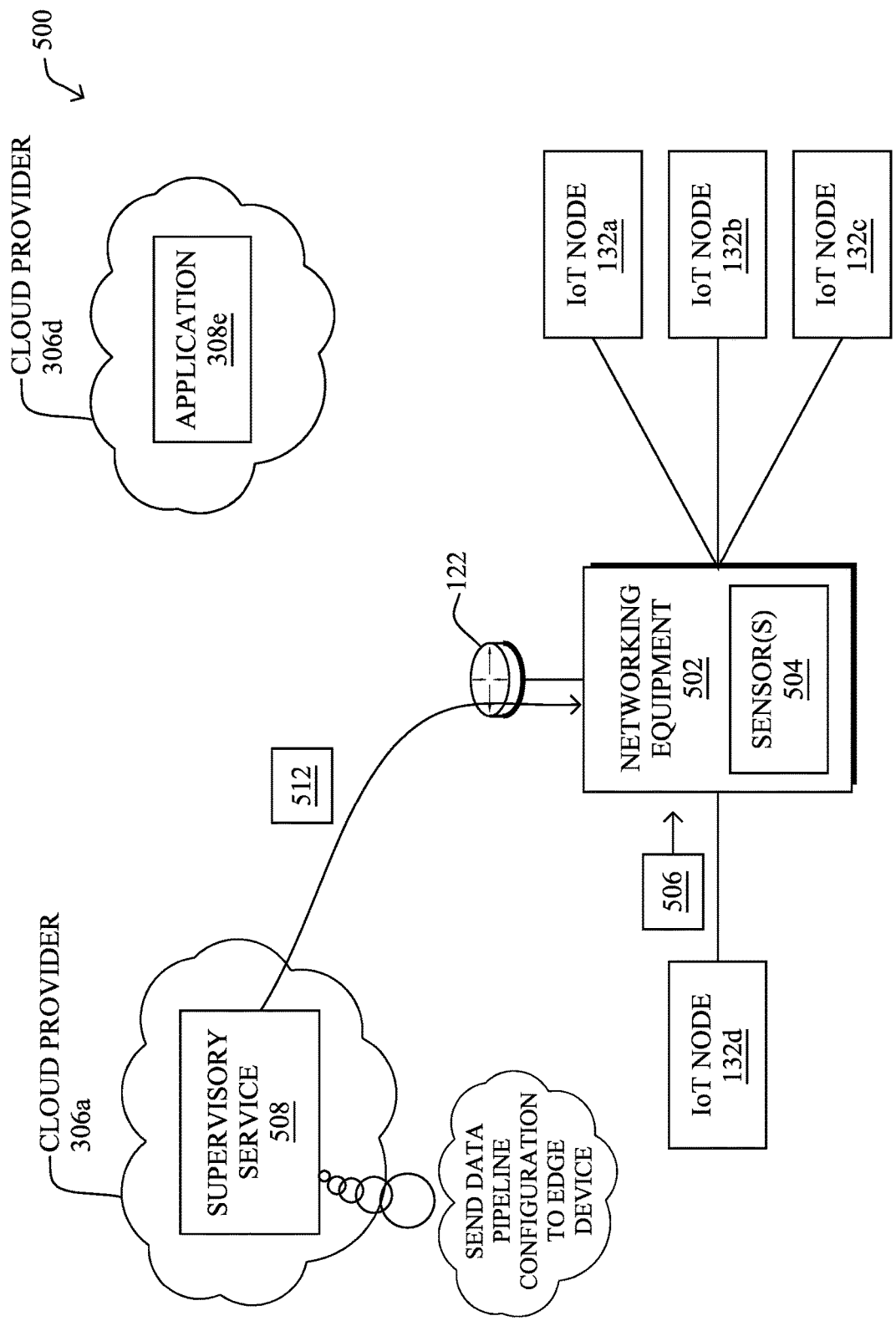

According to various embodiments, as shown in FIG. 5D, once supervisory service 508 has determined the data to be extracted/ingested by edge device 122, as well as the destination for that data, supervisory service 508 may generate a corresponding data pipeline configuration 512 for edge device 122. For instance, such a configuration may identify IoT node 132d to edge device 122 and the data to be ingested/extracted by edge device 122 from the traffic of IoT node 132d. In various embodiments, the data pipeline configuration 512 may also configure the appropriate protocol connectors, data mapping(s), data transformation(s), and/or data governance policies for edge device 122. In turn, supervisory service 508 may push the data pipeline configuration 512 to edge device 122.

As would be appreciated, the above configuration mechanism can help to quickly and automatically configure a data pipeline for IoT node 132d. In further embodiments, this approach may be repeated any number of times, so as to refine the data pipeline for IoT node 132d. For instance, assume that sensor(s) 504 detect a new protocol or other characteristic of the packets 506 from IoT node 132d, after supervisory service 508 sends data pipeline configuration 512 to edge device 122. In such a case, sensor(s) 504 may provide the updated information to supervisory service 508, which may adjust data pipeline configuration 512, accordingly (e.g., by configuring a new protocol connector, a new data transformation, etc.). Such a mechanism can also employ the use of digital twins, so as to identify any deviations in the expected behavior of IoT node 132d and report any anomalies to a user for review. Indeed, it may be the case that IoT node 132d has been compromised in some way or that its previous data pipeline configuration is no longer meeting its needs and may benefit from additional tuning.

Another example of how the techniques herein can be adaptive is that if/when new data models, destinations, device types, etc., are added to supervisory service 508, an administrator can also be alerted to this fact. Supervisory service 508 may also identify which device(s) would benefit from this new data model, as well as run simulations to compare the current vs. new data model to see what would be optimal to meet the objectives of the operator. If the simulations show that the current data model is more effective/efficient at meeting these defined objectives, then the operator may be presented with the choice of "Apply the new data model to all devices (Y/N)" and possibly even an auto-optimization option to the effect of "Always apply the new data models (Y/N)?" which may be provided if the simulation shows that the new model is superior.

Figure 5E:
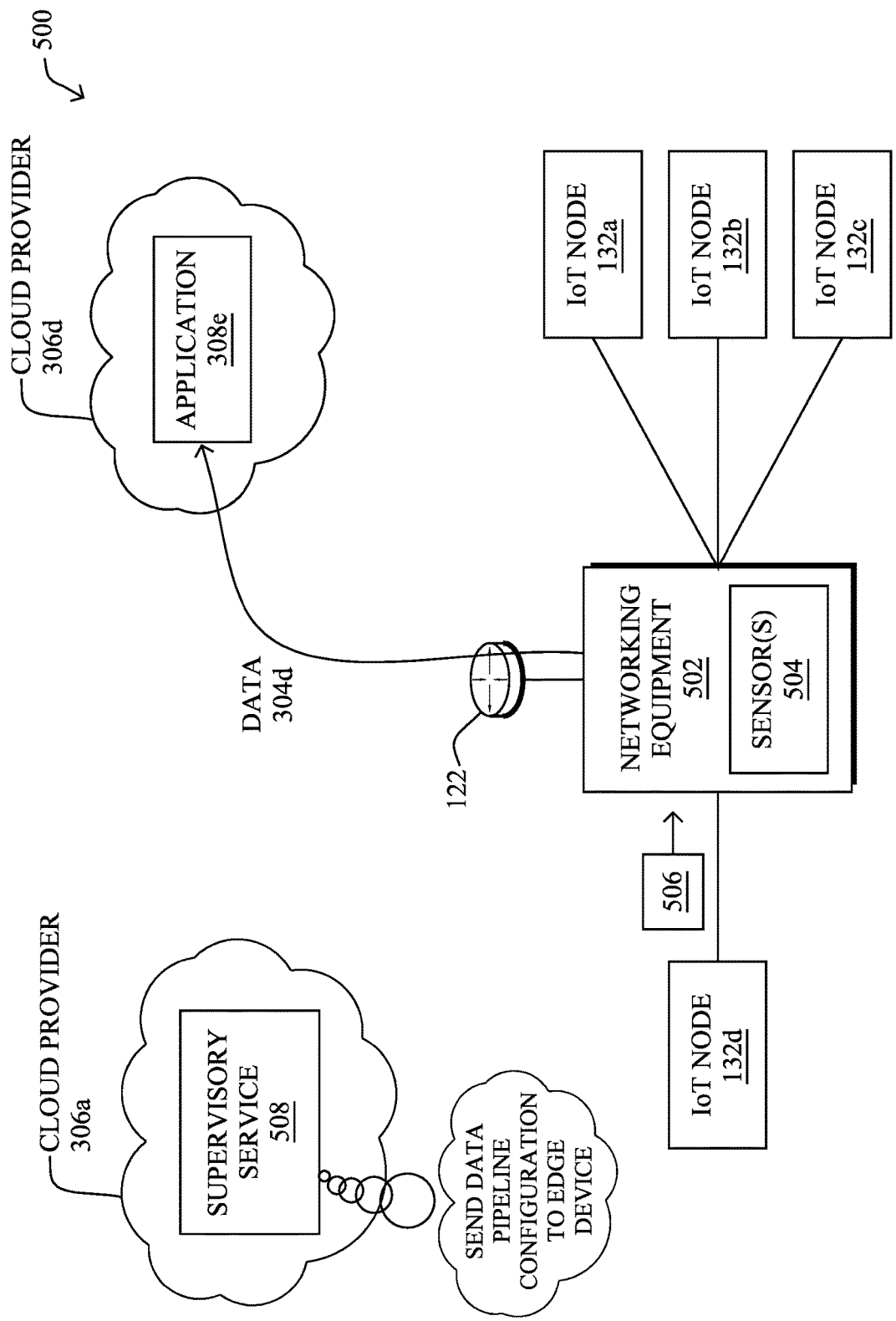

As shown in FIG. 5E, once edge device 122 has been configured appropriately to export the data of IoT node 132d to application 308e, it may proceed in a similar manner to those of IoT nodes 132a-132c, described previously with respect to FIG. 3. More specifically, edge device 122 may begin ingesting and extracting data from the traffic of IoT node 132d according to data pipeline configuration 512, apply any data mapping, transformations, and/or data governance policies to it, and then export the resulting data 304d to 308e.

Figure 7:
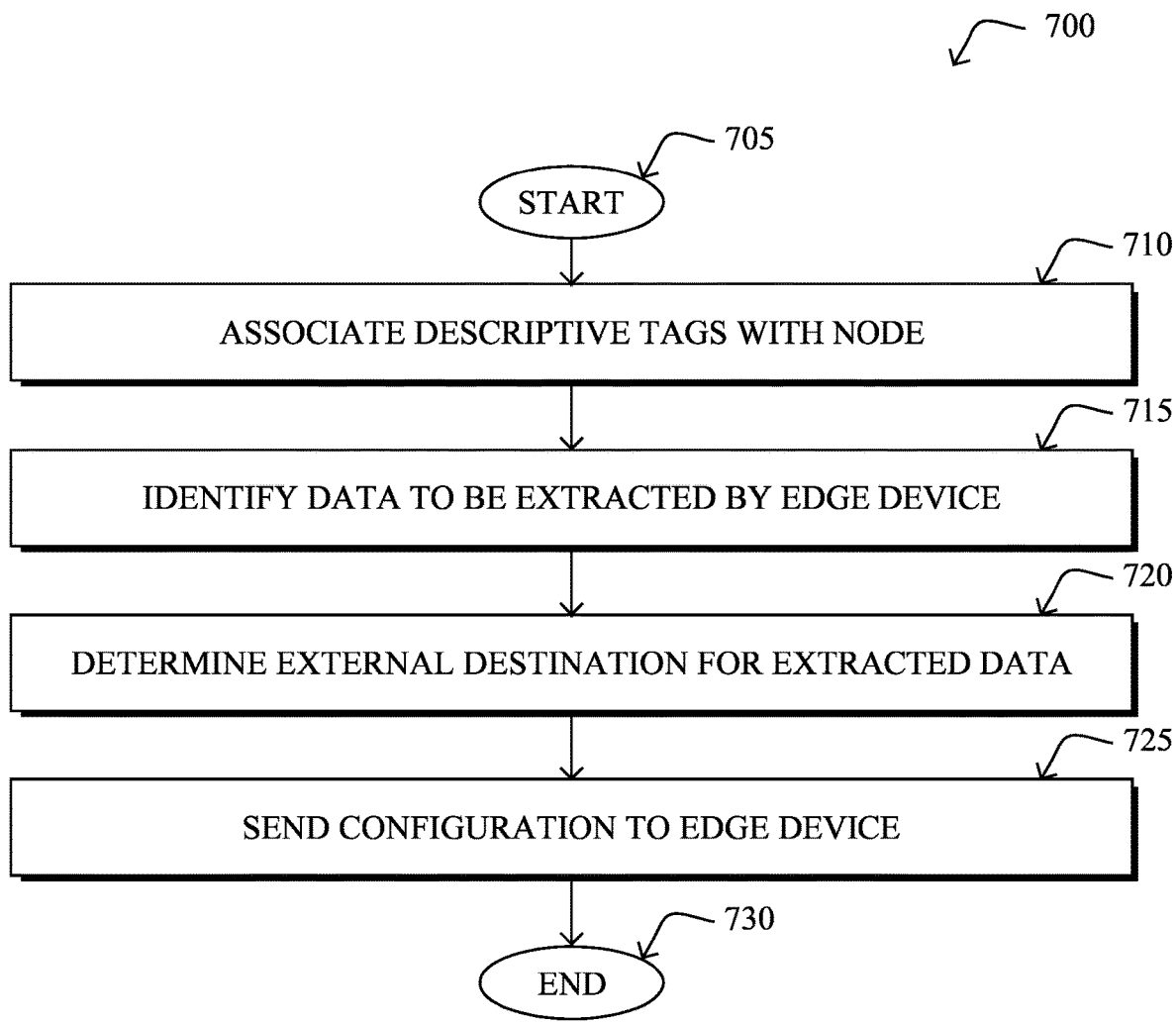
FIG. 7 illustrates an example simplified procedure for the configuration of a data pipeline for an edge device.

FIG. 7 illustrates an example simplified procedure for the configuration of a data pipeline for an edge device, in accordance with one or more embodiments described herein. For instance, procedure 700 may be performed by a service comprising one or more specially configured devices (e.g., one or more device 200, etc.). The procedure 700 may start at step 705, and continues to step 710, where, as described in greater detail above, the service may associate a plurality of descriptive tags with a node in a network. In various embodiments, the tag associations may be based on an inspection performed by one or more sensors deployed to the network of packets sent by the node. For instance, the sensor(s) may perform DPI or other inspection technique, to identify various information about the node, such as its manufacturer, model, device type, protocol(s) that it uses, and/or other information that can be garnered via the packet inspection.

At step 715, as detailed above, the service may identify, based on the plurality of descriptive tags, data to be extracted from traffic of the node by an edge device located at an edge of the network. For instance, the service may determine that the node is of a certain device type from a particular manufacturer and, based on this, determine that the node generates temperature, vibration, and proprietary measurements that should be extracted by the edge device from the traffic of the node. As would be appreciated, any number of different types of data may be identified for extraction, depending on the identity of the node.

At step 720, the service may determine, based on the plurality of descriptive tags, an external destination to which the data should be sent by the edge device after extraction, as described in greater detail above. In various cases, the external destination may take the form of a cloud-hosted application, monitoring and/or supervisory service (e.g., a service from the manufacturer of the node, a service associated with the operator of the network, etc.), a message broker (e.g., an MQTT message broker), combinations thereof, or the like. For instance, assume that the descriptive tags identify the node as being from Manufacturer X and of Model Y. In such a case, the service may determine that the data extracted from the traffic of the node should be sent to a cloud-hosted service associated with that manufacturer.

At step 725, as detailed above, the service may send a data pipeline configuration to the edge device. In various embodiments, the data pipeline configuration causes the edge device to extract the data from the traffic sent by the node and to send the data to the external destination. In further embodiments, the data pipeline configuration may also specify a data transformation that the edge device is to apply to the extracted data, prior to sending it to the external destination. For instance, the configuration may cause the extracted data to be transformed into a different unit of measure, a different number format, an aggregated value, etc. In various embodiments, the data pipeline configuration may also cause the edge device to extract the data according to a protocol indicated by at least one of the plurality of descriptive tags. Such a protocol may also differ from the protocol that the edge device uses to send the extracted and/or transformed data on to the external destination. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide an automated mechanism for the onboarding of a new IoT node to a network and the establishment of a data pipeline at the edge of the network for its data. This avoids complicated configuration schemes that require coordination between multiple parties, such as solution integrators, network operators, and the like.

While there have been shown and described illustrative embodiments for automatic orchestration of IoT device data management pipeline operations, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   associating, by a service, a plurality of descriptive tags with a node in a network, based on an inspection of packets sent by the node that is performed by one or more sensors deployed to the network;
   identifying, by the service and based on the plurality of descriptive tags, data to be extracted from traffic of the node by an edge device located at an edge of the network;
   determining, by the service and based on the plurality of descriptive tags, an external destination to which the data should be sent by the edge device after extraction; and
   sending, by the service, a data pipeline configuration to the edge device, wherein the data pipeline configuration causes the edge device to extract the data from the traffic sent by the node and to send the data to the external destination.

2. The method as in claim 1, wherein the one or more sensors inspect the packets by performing deep packet inspection (DPI) on the packets.

3. The method as in claim 1, wherein the edge device comprises one of: a network router, a network gateway, or a network access point.

4. The method as in claim 1, wherein the external destination is a cloud-hosted application that is hosted externally to the network.

5. The method as in claim 1, further comprising:
   identifying, by the service and based on the plurality of descriptive tags, a transformation to be applied to the data by the edge device and prior to the edge device sending the data to the external destination.

6. The method as in claim 1, wherein the external destination comprises an MQTT message broker.

7. The method as in claim 1, wherein the plurality of descriptive tags indicate at least one of: a manufacturer of the node, a model of the node, or a device type of the node.

8. The method as in claim 1, wherein the plurality of descriptive tags indicate a protocol used by the node, and wherein the data pipeline configuration configures the edge device to extract the data from the traffic sent by the node according to the protocol.

9. The method as in claim 8, wherein the data pipeline configuration causes the edge device to send the data to the external destination using a different protocol than the protocol used by the node.

10. The method as in claim 1, further comprising:
    providing, by the service, an indication that the data pipeline configuration may be out of data, based on one or more descriptive tags being associated with the node.

11. An apparatus, comprising:
    one or more network interfaces;
    a processor coupled to the one or more network interfaces and configured to execute one or more processes; and
    a memory configured to store a process that is executable by the processor, the process when executed configured to:
    associate a plurality of descriptive tags with a node in a network, based on an inspection of packets sent by the node that is performed by one or more sensors deployed to the network;
    identify, based on the plurality of descriptive tags, data to be extracted from traffic of the node by an edge device located at an edge of the network;
    determine, based on the plurality of descriptive tags, an external destination to which the data should be sent by the edge device after extraction; and
    send a data pipeline configuration to the edge device, wherein the data pipeline configuration causes the edge device to extract the data from the traffic sent by the node and to send the data to the external destination.

12. The apparatus as in claim 11, wherein the one or more sensors inspect the packets by performing deep packet inspection (DPI) on the packets.

13. The apparatus as in claim 11, wherein the edge device comprises one of: a network router, a network gateway, or a network access point.

14. The apparatus as in claim 11, wherein the external destination is a cloud-hosted application that is hosted externally to the network.

15. The apparatus as in claim 11, wherein the process when executed is further configured to:
    identify, based on the plurality of descriptive tags, a transformation to be applied to the data by the edge device and prior to the edge device sending the data to the external destination.

16. The apparatus as in claim 11, wherein the external destination comprises an MQTT message broker.

17. The apparatus as in claim 11, wherein the plurality of descriptive tags indicate at least one of: a manufacturer of the node, a model of the node, or a device type of the node.

18. The apparatus as in claim 11, wherein the plurality of descriptive tags indicate a protocol used by the node, and wherein the data pipeline configuration configures the edge device to extract the data from the traffic sent by the node according to the protocol.

19. The apparatus as in claim 18, wherein the data pipeline configuration causes the edge device to send the data to the external destination using a different protocol than the protocol used by the node.

20. A tangible, non-transitory, computer-readable medium storing program instructions that cause a device to execute a process comprising:
- associating a plurality of descriptive tags with a node in a network, based on an inspection of packets sent by the node that is performed by one or more sensors deployed to the network;
- identifying, based on the plurality of descriptive tags, data to be extracted from traffic of the node by an edge device located at an edge of the network;
- determining, based on the plurality of descriptive tags, an external destination to which the data should be sent by the edge device after extraction; and
- sending a data pipeline configuration to the edge device, wherein the data pipeline configuration causes the edge device to extract the data from the traffic sent by the node and to send the data to the external destination.

* * * * *

UNITED STATES PATENT AND TRADEMARK OFFICE
CERTIFICATE OF CORRECTION

PATENT NO. : 11,616,727 B2
APPLICATION NO. : 17/223396
DATED : March 28, 2023
INVENTOR(S) : Robert E. Barton It is certified that error appears in the above-identified patent and that said Letters Patent is hereby corrected as shown below:

In the Specification

Column 11, Line 61, please amend as shown:
details (e.g., Device ID, SCADA station, PLC, Win- Column 11, Line 65, please amend as shown:
Heartbeat, Emergency Break, Data Push, etc.).

Signed and Sealed this
Twentieth Day of June, 2023

Katherine Kelly Vidal
*Director of the United States Patent and Trademark Office*